(12) United States Patent
Saffold

(10) Patent No.: US 6,174,012 B1
(45) Date of Patent: Jan. 16, 2001

(54) REMOVABLE STORAGE TRUNK FOR TRUCKS

(76) Inventor: David Johnston Saffold, 2225 Roanoke Rd., Clarksville, TN (US) 37043

( * ) Notice: Under 35 U.S.C. 154(b), the term of this patent shall be extended for 0 days.

(21) Appl. No.: 09/483,507

(22) Filed: Jan. 15, 2000

(51) Int. Cl.$^7$ .................................................. B60R 9/06
(52) U.S. Cl. ........................................ 296/37.6; 224/404
(58) Field of Search ............................. 296/37.6, 57.1; 224/404, 542, 539, 543, 402, 403

(56) References Cited

U.S. PATENT DOCUMENTS

| | | | |
|---|---|---|---|
| 4,215,896 | * 8/1980 | Drouin | 296/37.6 X |
| 4,249,684 | 2/1981 | Miller . | |
| 5,083,829 | * 1/1992 | Fonseca | 296/37.6 |
| 5,207,469 | * 5/1993 | Rossi | 296/37.6 |
| 5,232,259 | * 8/1993 | Booker | 296/37.6 |
| 5,320,397 | * 6/1994 | Peterson et al. | 296/57.1 |
| 5,395,019 | 3/1995 | Christensen . | |
| 5,498,049 | * 3/1996 | Schlachter | 296/37.6 |
| 5,564,768 | 10/1996 | Saffold . | |
| 5,564,776 | 10/1996 | Schlachter . | |
| 5,803,525 | * 9/1998 | Lipinski et al. | 296/57.1 |
| 5,816,638 | * 10/1998 | Pool, III | 296/57.1 X |
| 5,857,724 | * 1/1999 | Jarman | 296/57.1 X |
| 5,992,719 | * 11/1999 | Carter, III | 296/37.6 X |

* cited by examiner

Primary Examiner—Joseph D. Pape
(74) Attorney, Agent, or Firm—David J. Saffold

(57) ABSTRACT

The present invention is a removable storage trunk for trucks of the type with a rear bed including a floor, right and left side walls, right and left upstanding door stops extending inward from the right and left side walls, respectively, and a rear gate door movable between an open position and a closed position. The removable storage trunk includes a right, left, top, bottom, and forward wall connected together to partially define a storage compartment therein accessible through an opening defined by a rear perimeter surface. The trunk further includes right and left side flanges extending outward from respective right and left portions of the rear perimeter surface and into a gap defined between rearward surfaces of the right and left door stops and a forward surface of the rear gate door when the trunk is installed in the truck and the rear gate door is in the closed position. The truck further includes right and left flanges retainer extending into the gap and above the right and left side flanges to prevent upward removal of the trunk when installed in the truck.

3 Claims, 4 Drawing Sheets

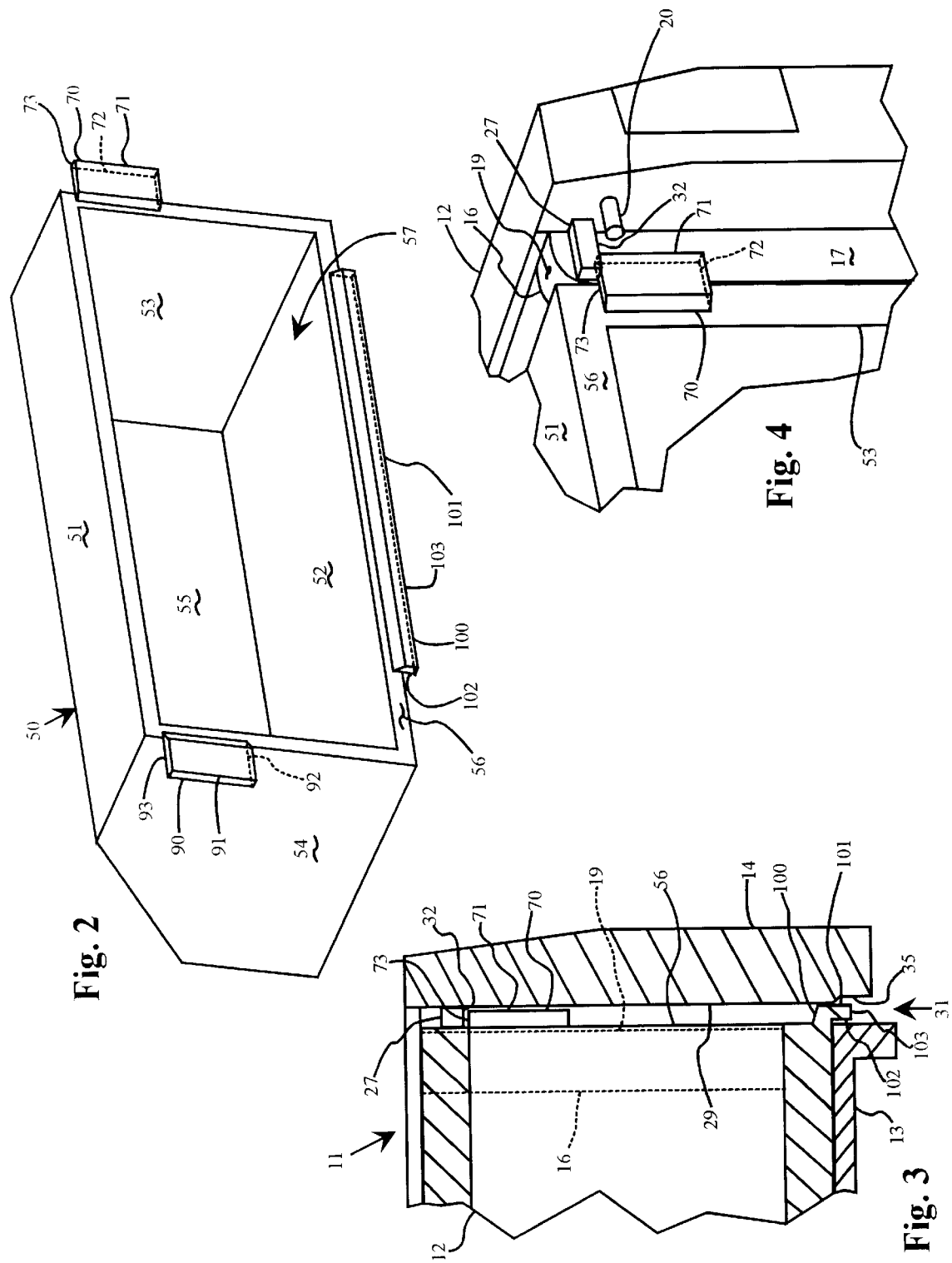

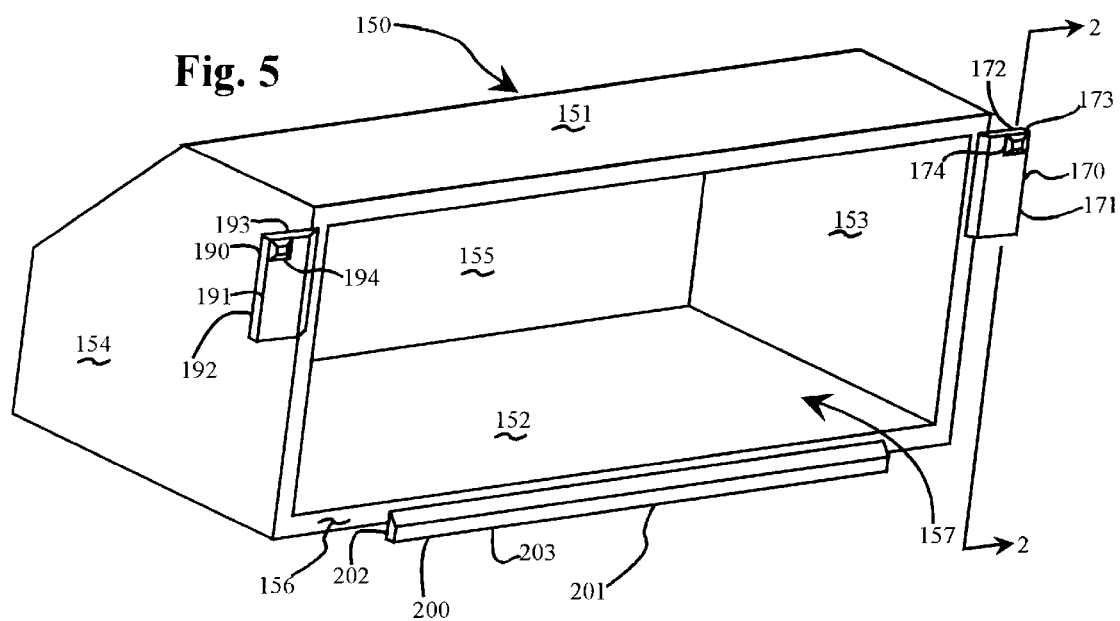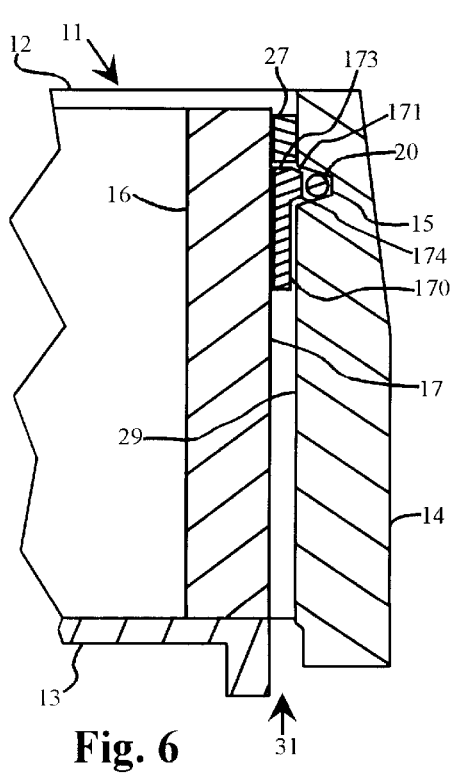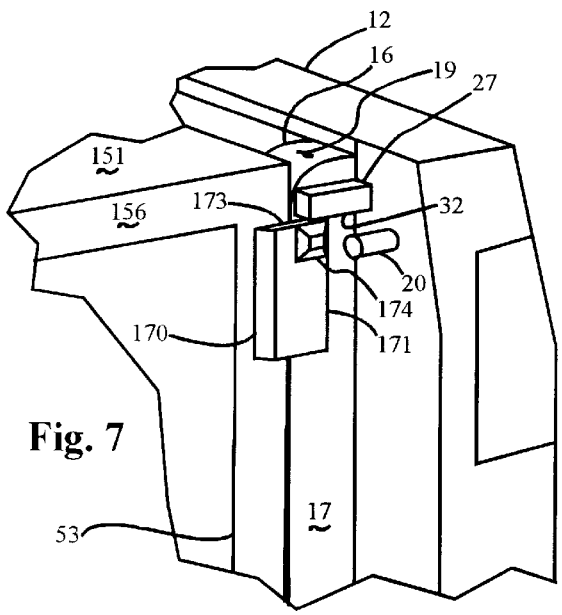

REMOVABLE STORAGE TRUNK FOR TRUCKS

BACKGROUND OF THE INVENTION

The present invention relates to the field of storage devices for motor vehicles, and more particularly to storage devices for trucks.

Trucks of the type with open rear bed cargo areas accessible through a rear gate door such as conventional pickup trucks are especially susceptible to unwanted intrusion. These vehicles generally have no secure storage area that will keep cargo and personal effects out of sight and secure. Articles left unattended in the truck (especially articles stored in the rear bed of the truck) are viewable by potential thieves and subject to theft and tampering. The theft of articles from these open vehicles is a major problem for owners. Moreso still, the threat of theft of articles is a major inconvenience to owners when shopping, traveling, or engaging in any other activity that involves transporting articles in the vehicle.

In the past, storage devices that create secure storage space in trucks have been devised to address the above described security problem. For the most part, these storage devices are relatively permanently installed (to prevent theft of the entire device and its contents) in the vehicle—usually by mounting the storage device to the rear bed of the truck with metal bolts or sheet metal screws which require deforming the chassis of the truck (drilling holes, etc.) and the use of tools to remove. One consequence of permanently mounting the storage device in the rear bed of the truck is to reduce the effective cargo capacity of the rear bed of the truck and thus render the truck less useful for transporting cargo. Furthermore, if the owner needs to use the rear bed of the truck at its full size, the storage device must be removed from its relatively permanent attachment to the vehicle with tools, which is a time consuming and laborious operation for the owner—not to mention the inconvenience of having to reinstall the storage device back into the truck. The owner of the truck is further inconvenienced by such storage devices since, because they are relatively permanently attached, they tend to obstruct access to the rear cargo bed making it difficult to load and unload articles stored otherwise therein. One such device is depicted in U.S. Pat. No. 5,564,776 issued to Bradley S. Schlachter. Schachter's invention must be relatively permanently attached to the truck with threaded bolts and cooperating nuts. Another such devise is U.S. Pat. No. 5,498,049 also issued to Bradley S. Schlachter. The use of this invention requires drilling holes into the chassis and is attached to the vehicle via sheet metal screws.

Other storage devices require an initial installation of externally supplied latching hardware onto the truck chassis and/or the storage device itself in order to secure the storage device to the truck, which is relatively complicated and cumbersome for the truck owner. Furthermore, when latching hardware is mounted to the truck it can degrade the aesthetics of the truck as well as impede the loading and unloading of articles in the rear bed. One such device is depicted in U.S. Pat. No. 4,249,684 issued to Kenneth Miller. Miller's invention requires mounting properly spaced rails to the vehicle using sheet metal screws or welding. Another such device is depicted in U.S. Pat. No. 5,395,019 issued to David Christensen. Christensen's invention also requires the relatively permanent installation of a latching mount to the vehicle.

Furthermore, it seems obvious that some of the above cited prior art as well as many other prior art inventions require an initial assembly of the storage device components once purchased from the manufacture which further adds to the inconvenience of the user.

There is, therefore, a need in the industry for a device that addresses the problems outlined above as well as other related and unrelated problems.

BRIEF SUMMARY OF THE INVENTION

The present invention is an apparatus that creates a secure storage trunk in the rear bed of trucks and is quickly installable therein and removable therefrom without the need of tools, assembly, or alteration to the existing structure of the truck.

Disclosed is a removable storage trunk for trucks of the type with a rear bed including a floor, right and left side walls including right and left upstanding door stops, respectively, and a rear gate door movable between an open position and a lockable closed position wherein a forward surface of the rear gate door and rearward surfaces of the right and left door stops are separated by right and left door bumpers to define a gap therebetween. The removable storage trunk includes right, left, top, bottom, and a forward wall connected together to partially define a storage compartment therein accessible through an opening defined by a rear perimeter surface. The removable storage trunk further includes right, left, and bottom flanges extending outward from respective right, left and bottom portions of the rear perimeter surface. When the trunk is properly installed in the truck and the rear gate door is in the closed position, the opening is adjacent the rear gate door and the right and left flanges extend below the right and left door bumpers, respectively, and into the gap defined between the rear gate door and the right and left door stops. Furthermore, the bottom flange extends into the gap defined between a rear surface of the floor and the forward surface of the rear gate door of the truck such that the removable storage trunk is securely latched into the rear bed of the truck and removable only by moving the rear gate door to the open position.

As described above, the right and left door bumpers act as flange retainers and in conjunction with the right and left door stops and the rear gate door prevent the trunk from being removed from the truck when the rear gate door is in the closed position. However, other conventional features of the truck such as the rear gate door latch housings or other features that protrude into the gap can be used as flange retainers wherein the right and left flanges engage the right and left flange retainers to prevent upward removal of the trunk from the truck when the rear gate door is in the closed position. Furthermore, the bottom flange of the trunk can be shaped to retain the trunk in the truck, instead of or in addition to the right and left flanges, when the rear gate door is in the closed position. Thus, the present invention is a simple apparatus that takes advantage of the original structure of conventional pick-up trucks to provide a quick and easy means for truck owners to securely store articles in their truck. Furthermore, as will be shown below, the present invention is of such a simple design that all of its required features are amenable to one piece manufacture such that no assembly of parts is required by either the manufacturer or the customer before installation in the truck.

In accordance with the preferred embodiment of the present invention, the removable storage trunk is quickly removably manually installable in and quickly removably manually extractable from the truck without requiring tools or the need for initial alteration of the truck's chassis from its original factory structure. Thus, the user is provided with a quick and easy means for securely storing articles in the rear bed of the truck.

It is therefor an object of the present invention to provide a secure storage means for trucks.

Another object of the present invention is to provide a storage trunk that is quickly and easily installable into and quickly and easily removable from the rear bed of trucks.

Yet another object of the present invention is to provide a storage trunk that is installable and removable from the rear bed of a truck without the need for tools of any kind.

Yet another object of the present invention is to provide a storage trunk that removably latches to the rear bed of a truck without the need for installing mating latching hardware onto the truck or altering the structure of the truck from its structure as manufactured by the original manufacturer.

Yet another object of the present invention is to provide a storage trunk that needs no assembly by the owner before installation in a truck.

Yet another object of the present invention is to provide a storage trunk that needs no assembly of separate parts by the manufacturer or the customer before installation in a truck.

Other objects, features, and advantages of the present invention will become apparent upon reading and understanding this specification when taken in conjunction with the accompanying drawings.

BRIEF DESCRIPTION OF THE SEVERAL VIEWS OF THE DRAWINGS

FIG. 2 is an isolated, perspective view of the removable storage trunk of FIG. 1 viewed from the left and rear with the hidden features of flange retainers of the trunk shown by broken lines.

FIG. 3 is a cross-section view along lines 1,1 of the trunk and truck configuration of FIG. 1 with the rear gate door of the truck in the closed position with a right door stop shown by broken lines.

FIG. 4 is a cut-away, close-up perspective view of the right corner portion of the trunk and truck configuration of FIG. 1 with the rear gate door in the open position (not shown), wherein the hidden features of the right side flange of the trunk are shown by broken lines.

FIG. 5 is a cut-away, rear, perspective view of a removable storage trunk in accordance with a first alternative embodiment of the present invention.

FIG. 6 is a cut-away, cross-section view along lines 2,2 of the trunk of FIG. 5 installed in the truck of FIG. 1 with the rear gate door in the closed position.

FIG. 7 is a cut-away, close-up, perspective view of the right corner portion of the trunk of FIG. 5 installed in the truck of FIG. 1 with the rear gate door in the open position (not shown).

DETAILED DESCRIPTION OF THE INVENTION

Figure 1:
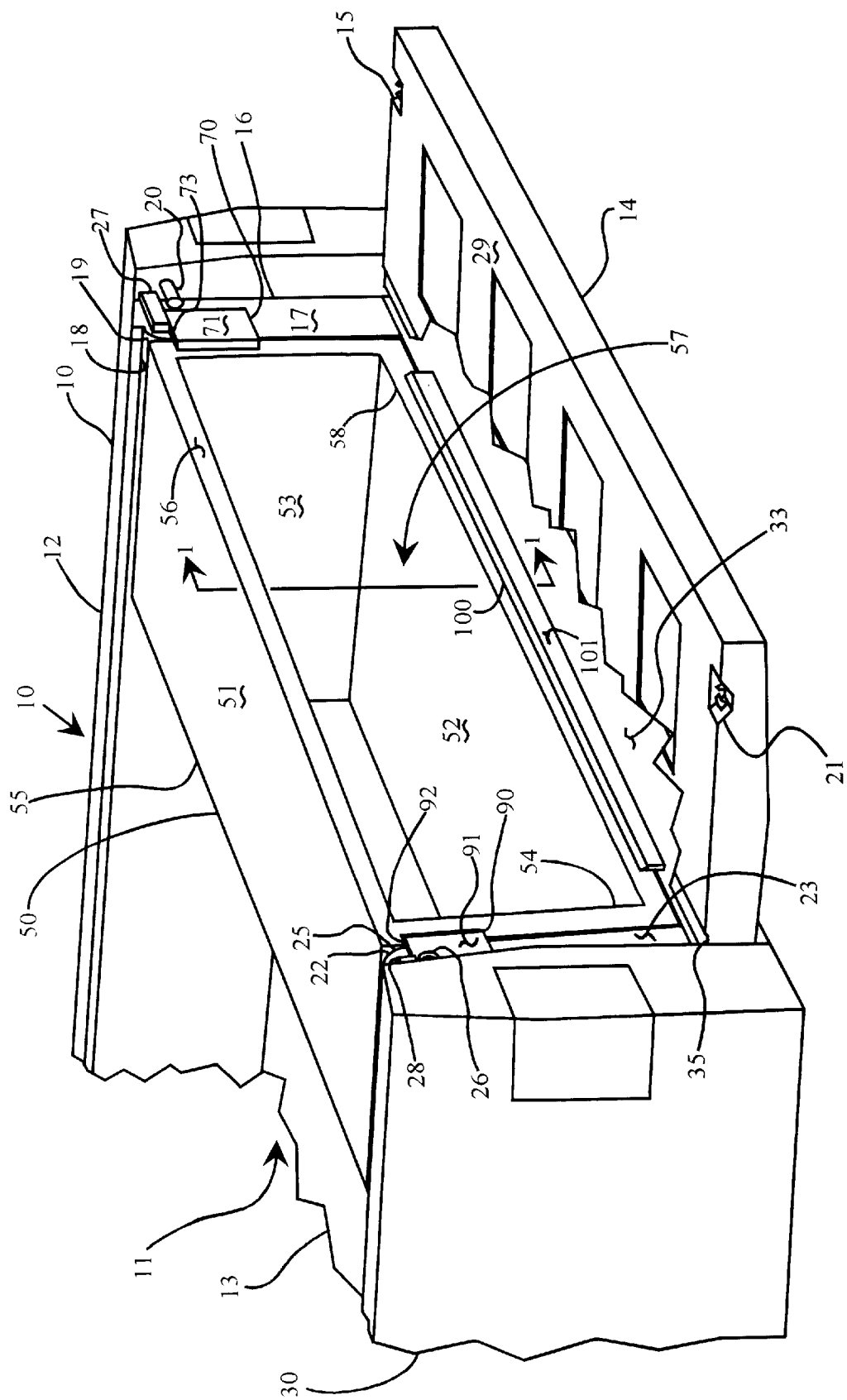
FIG. 1 is a cut-away, rear, perspective view of a rear bed of a truck and a removable storage trunk in accordance with the preferred embodiment of the present invention, wherein the removable storage trunk is in an installed position in the truck and the rear gate door of the truck is in an open position.

Referring now to the drawings in which like numerals represent like components throughout the several views FIG. 1 is a cut-away, rear, perspective view of a rear bed 11 of a truck 10 and a removable storage trunk 50 in accordance with the preferred embodiment of the present invention, wherein the removable storage trunk 50 is in an installed position in the truck 10. The rear bed 11 comprises in part right 12 and left 30 upwardly extending side walls, a floor 13 including a rearward surface 33, and a rear gate door 14. The rear bed 11 further includes right 16 and left 22 upwardly extending door stops extending inward from the right 12 and left 30 upwardly extending side walls, respectively, and upwardly from the floor 13 as shown in the drawings. The right door stop includes a rearward surface 17, forward surface 18, and inner surface 19, and the left door stop 22 includes a rearward surface 23, forward surface 24, (not shown but similar to 18) and inner surface 25. The rear gate door 14 includes a forward surface 29 and is movable between an open position (shown in FIG. 1) and a closed position (FIG. 3) wherein the forward surface 29 of the rear gate door 14 abuts right 27 and left 28 flange retainers extending, respectively, from the right 12 and left 30 side walls and along upper portions of the rearward surfaces 17,23 of the right 16 and left 22 door stops. In this embodiment of the present invention, the right 27 and left 28 flange retainers are door bumpers that function to cushion the rear gate door 14 during closure as well as protect the door stops 16,22 and the rear gate door 14 from damaging metal to metal contact. The rear gate door 14 further includes right 15 and left 21 latch housings which latch onto respective right 20 and left 26 latch bars extending inward from the right 12 and left 30 side walls, respectively, of the rear bed 11 when the rear gate door 14 is in the closed position. The features of the truck 10 described above are common to conventional pick-up trucks and their operation, general structure, location within the rear bed 11, and function is obvious to persons reasonably skilled in the art as well as most owners of conventional pick-up trucks.

Referring now also to FIG. 2 which is an isolated, perspective view of the removable storage trunk 50 viewed from the left and rear, the removable storage trunk 50, hereafter referred to as the trunk 50, includes a top wall 51, bottom wall 52, forward wall 55, and right 53 and left 54 side walls connected together to form a box like structure partially defining a storage compartment 57 therein. The trunk 50 further includes a rear perimeter surface 56 defining an opening into the storage compartment 57 as shown in the drawings. When properly installed in the truck 10, the trunk 50 substantially extends between the inner surfaces 19,25 of the door stops 16,22 and the rear perimeter surface 56 is substantially coplanar with the rearward surfaces 17,23 of the door stops 16,22 and the rearward surface 33 of the floor 13 such that the storage compartment 57 is substantially closed off and inaccessible from the outside when the rear gate door 14 is in the closed position. The trunk 50 further includes right 70 and left 90 side flanges and a bottom flange 100 each extending rearward from the rear perimeter surface 56. The right 70 and left 90 side flanges extend outward from the right side wall 53 and left side wall 54, respectively, and the bottom flange 100 extends downward from the bottom wall 52. The right 70 and left 90 side flanges each include, respectively, a rearward surface 71,91, forward surface 72,92, and top surface 73,93. The bottom flange 100 includes a rearward surface 101, a forward surface 102, and a bottom surface 103.

Referring now also to FIG. 3 which is a cross-section view along lines 1,1 of the trunk 50 installed in the truck 10 with the rear gate door 14 in the closed position, and FIG. 4 which is a cut-away, perspective view of the right corner portion of the trunk 50 installed in the truck 10 with the rear gate door 14 in the open position. When the trunk 50 is properly installed in the rear bed 11 of the truck 10, the right 70 and left 90 side flanges extend rearward from the rear perimeter surface 56 and outward from the right and left side walls 53,54, respectively, such that the forward surfaces 72,92 of the right 70 and left 90 side flanges extend outward from the right 53 and left 54 side walls of the trunk 50 and abuttingly along the rearward surfaces 17,23, respectively, of the right 16 and left 22 door stops, and the top surfaces 73,93 of the right 70 and left 90 side flanges extend below the right 27 and left 28 flange retainers, respectively. Furthermore, the bottom flange 100 extends rearward from the rear perimeter surface 56 and downward from the bottom wall 52 of the trunk 50 such that the forward surface 102 of the bottom flange 100 extends downward from the bottom wall 52 of the trunk 50 and abuttingly along the rearward surface 33 of the floor 13 of the truck 10. Note: For clarity, in FIG. 3 a gap is shown between the abutting surfaces just described. Furthermore, the interaction of the left side flange 90 with the left door stop 22 and the left flange retainer 28, though not shown in FIGS. 3 and 4, is substantially similar to that of the right side flange 70 with the right door stop 16 and the right flange retainer 27 as shown in FIGS. 3 and 4.

When the rear gate door 14 is in the closed position the forward surface 29 of the rear gate door 14 abuts the right 27 and left 28 flange retainers such that a gap 31 is defined between the forward surface 29 of the rear gate door 14 and the substantially coplanar rearward surfaces 17,23,33 of the right 16 and left 22 door stops and the floor 14 as shown in FIG. 3. When properly installed in the truck 10, the rear perimeter surface 56 of the trunk 50 is substantially coplanar with the rearward surfaces 17,23,33 of the right 16 and left 22 door stops and the floor 13, and the right 70 and left 90 side flanges extend below the right 27 and left 28 flange retainers and, along with the bottom flange 100, extend into the gap 31 and substantially between the forward surface 29 of the rear gate door 14 and the rearward surfaces 17,23,33 of the right 16 and left 22 door stops and the floor 14, respectively. Thus, the trunk 50 is securely latched to the truck 10 when the rear gate door 14 is in the closed position. Furthermore, the flanges 70,90,100 extend only partially inwards along the rear perimeter surface 56 of the trunk 50 so that gasket material (not shown) can be attached to the rear perimeter surface 56 creating a watertight seal between the rear perimeter surface 56 and the forward surface 29 of the rear gate door 14 preventing moisture from entering the interior storage compartment 57 of the trunk 50.

In accordance with the above description it is now shown that when the trunk 50 is properly installed in the rear bed 11 of the truck 10 and the rear gate door 14 is in the closed position, the right 70 and left 90 side flanges are securely held in place within the gap 31 by the right 27 and left 28 flange retainers extending thereabove and the rearward surfaces 17,23 of the right 16 and left 22 door stops and the forward surface 29 of the rear gate door 14 which effectively prevents the trunk 50 from being removed from the truck 10. Furthermore, the right 70 and left 90 side flanges in conjunction with the bottom flange 100 also act to immovably hold the trunk 50 in place preventing undesirable noise and surface damage to the trunk 50 and truck 10 when the truck 10 is moving.

For clarity, the drawings show some gap between the flanges 79,90,100 and engaging features of the truck 10 (i.e., forward surface 29, rearward surfaces 17,23,33) where a slight press fit is intended for preventing movement of the trunk 50 when the truck 10 is moving even though not necessary to prevent the trunk 50 from being removed from the truck 10. However, as would be understood by those skilled in the art, a sufficiently tight press fit either of the right 70 and left 90 side flanges or the bottom flange 100 within the gap 31 formed between the forward surface 29 of the rear gate door 14 and the rearward surfaces 17,23,33 will, in itself, prevent removal of the trunk 50 from the truck 10 and is considered covered under the present invention.

As described above, the truck 10 includes flange retainers 27,28 which function to lock the trunk 50 into the installed position preventing upward removal of the trunk 50 from the rear bed 11 when the rear gate door 14 is in the closed position. In that preferred embodiment, the flange retainers 27,28 are rear gate door bumpers that are original equipment of the truck 10. However, other features of the truck 10 can similarly act as flange retainers that function to lock the truck 50 into the truck 10. Described below are alternative embodiments of the present invention which include examples of other features of the truck 10 which function as flange retainers. In fact, there are many features of conventional pickup trucks depending on their make and model which can function as flange retainers in accordance with the present invention which would be obvious to persons reasonably skilled in the art and should be considered covered under the scope of the present invention.

Referring now to FIG. 5 which is a cut-away, rear, perspective view of a removable storage trunk in accordance with a first alternative embodiment of the present invention. In this embodiment of the present invention, the right 15 and left 21 latch housings of the truck 10 function as flange retainers. The structure and function of the elements 151, 152, 153, 154, 155, 156, 157, 200, 201, 202, 203 of this first alternative embodiment of the trunk 150 correspond exactly, one-to-one, with the above described elements 51, 52, 53, 54, 55, 56, 57, 100, 101, 102, 103 of the preferred embodiment of the trunk 50 and thus need not be further described. The only difference in this first alternative embodiment of the trunk 150 is that the trunk 150 includes right 170 and left 190 side flanges so shaped and positioned to engage the right 15 and left 21 latch housings of the rear gate door 14 of the truck 10 which is now described.

Refer now also to FIG. 6 which is a cut-away, cross-section view along lines 2,2 of the trunk of FIG. 5 installed in the truck of FIG. 1 with the rear gate door in the closed position ion, and FIG. 7 which is a cut-away, perspective view of the right corner portion of the trunk 150 installed in the truck 10 of FIG. 1 with the rear gate door 14 in the open position. The right 170 and left 190 side flanges of the trunk 150 include, respectively, rearward surfaces 171,191 with right 174 and left 194 latch tabs extending rearward therefrom. The right 174 and left 194 latch tabs each angle rearward and inward upon itself from the respective rearward surfaces 171,191 of the side flanges 170,190 as shown in the drawings. As depicted in FIG. 6, the position and structure of the right 174 and left 194 latch tabs are such to partially extend into respective right 15 and left 21 latch housings in the rear gate door 14 of the truck 10 when the rear gate door 14 is in the closed position and the trunk 150 is in the installed position. Thus, the right 174 and left 194 latch tabs engage the right 15 and left 21 latch housings to prevent the trunk 150 from being moved upward out of the truck 10 when the trunk 150 is properly installed therein and the rear gate door 14 is in the closed position.

Figure 8:
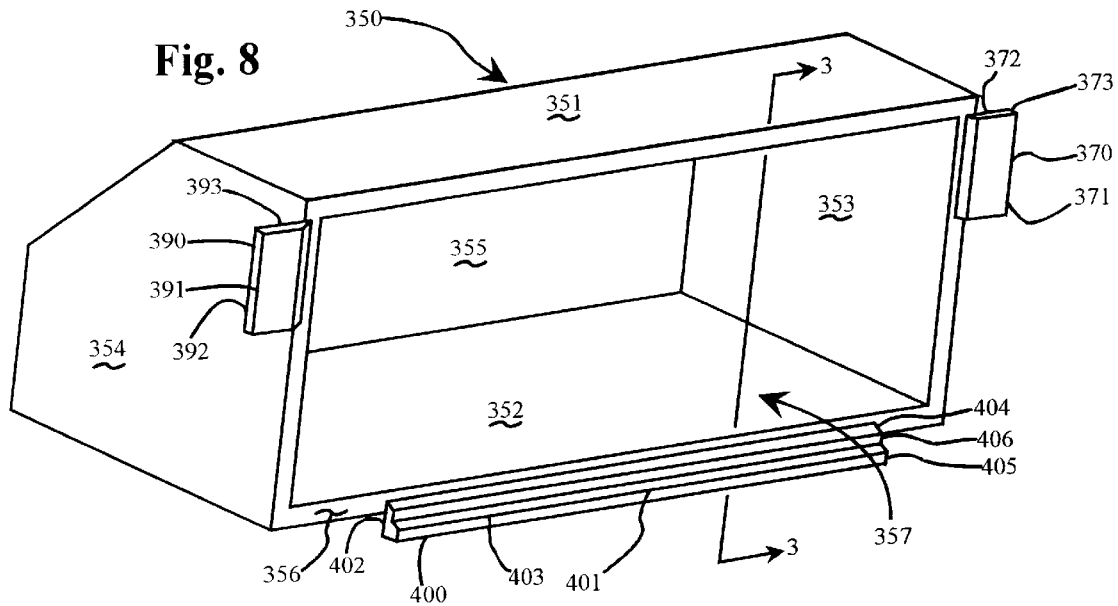
FIG. 8 is a cut-away, rear, perspective view of a removable storage trunk in accordance with a second alternative embodiment of the present invention.
Figure 9:
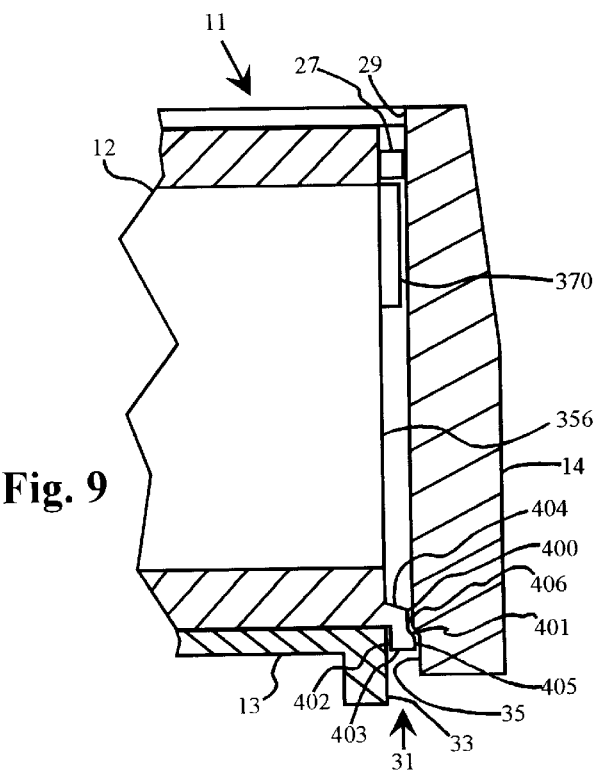
FIG. 9 is a cut-away, cross-section view along lines 3,3 of the trunk of FIG. 8 installed in the truck of FIG. 1 with the rear gate door in the closed position.

Referring now to FIG. 8 which is a cut-away, rear, perspective view of a removable storage trunk in accordance with a second alternative embodiment of the present invention, and FIG. 9 which is a cut-away, cross-section view along lines 3,3 of the trunk of FIG. 8 installed in the truck of FIG. 1 with the rear gate door in the closed position. In this embodiment of the present invention, the rear gate door 14 of the truck 10 includes a recess 35 along the bottom portion of the forward surface 29 thereof which functions to engage and retain a bottom flange 400 of the trunk 350. The structure and function of the elements 351, 352, 353, 354, 355, 356, 357, 370, 371, 372, 373, 390, 391, 392, 393 of this second alternative embodiment of the trunk 150 correspond exactly, one-to-one, with the above described elements 51, 52, 53, 54, 55, 56, 57, 70, 71, 72, 73, 90, 91, 92, 93 of the preferred embodiment of the trunk 50 and thus need not be further described.

The bottom flange 400 extends rearward from the rear perimeter surface 356 of the trunk 350 and downward from the bottom wall 352 to form a generally L-Shaped cross-section and includes a top surface 404, bottom surface 403, forward surface 402, and rearward surface 401. The rearward surface 401 of the bottom flange 400 includes a top portion 406 extending downward and rearward from the top surface 404 and a bottom portion 405 extending downward from the top portion 406. The rearward surface 401 is so shaped that the bottom portion 405 thereof extends into and latchingly engages the recess 35 in the rear gate door 14 of the truck 10 when the rear gate door 14 is in the closed position and the trunk 350 is in the installed position, as shown in FIG. 9. Thus, the bottom flange 400 engages the recess 35 in the rear gate door 14 to prevent the trunk 350 from being moved upward out of the truck 10 (independently from the side flanges 370, 390) when the trunk 350 is properly installed therein and the rear gate door 14 is in the closed position.

While the embodiments of the present invention which have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below. It is also understood that any relative dimensions and relationships shown on the drawings are given as the preferred relative dimensions and relationships, but the scope of the invention is not to be limited thereby.

I claim:

1. A manually manipulatively installable and removable trunk for a truck including a rear bed partially defined by a floor, right and left side walls, a rear gate door movable between a closed position and an open position and including right and left rear gate door latch housings, and right and left upwardly extending rear gate door stops extending inward from the right and left side walls, respectively, wherein, when the rear gate door is in the closed position a right gap is defined between the right upwardly extending rear gate door stop and the rear gate door, and a left gap is defined between the left upwardly extending rear gate door stop and the rear gate door, said trunk comprising, in combination;

a container section including right, left, top, bottom, and forward walls connected together to partially define an interior storage compartment therein, and a rear perimeter surface defining an access opening through which said interior storage compartment is accessible, wherein when said trunk is properly installed in the rear bed of the truck said container section extends into the rear bed of the truck and between the right and left upwardly extending rear gate door stops and said rear perimeter surface substantially abuts the rear gate door to substantially close off said access opening when the rear gate door is in the closed position; and right and left side flanges extending outward from said right and left walls, respectively, of said container section and each including a latch tab extending rearward therefrom, wherein said right side flange extends into the right gap and said latch tab thereof extends partially into the right rear gate door latch housing, and said left side flange extends into the left gap and said latch tab thereof extends partially into the left rear gate door latch housing to latchingly engage said trunk to the truck when said trunk is installed in the rear bed of the truck and the rear gate door is in the closed position.

2. A manually manipulatively installable and removable trunk for a truck including a rear bed partially defined by a floor with a rearward end surface, right and left side walls, a rear gate door movable between a closed position and an open position and including a forward surface with a recessed portion extending along a bottom portion thereof, and right and left upwardly extending rear gate door stops extending inward from the right and left side walls, respectively, wherein, when the rear gate door is in the closed position a right gap is defined between the right upwardly extending rear gate door stop and the forward surface of the rear gate door, a left gap is defined between the left upwardly extending rear gate door stop and the forward surface of the rear gate door, and a bottom gap is defined between the rearward end surface of the floor and the forward surface of the rear gate door, said trunk comprising, in combination;

a container section including right, left, top, bottom, and forward walls connected together to partially define an interior storage compartment therein and a rear perimeter surface defining an access opening through which said interior storage compartment is accessible, wherein said container section extends into the rear bed of the truck and between the right and left upwardly extending rear gate door stops and said rear perimeter surface substantially abuts the rear gate door to substantially close off said access opening when the rear gate door is in the closed position when said trunk is properly installed in the rear bed of the truck;

right and left side flanges extending rearward from said rear perimeter surface and outward from said right and left walls, respectively, of said container section, wherein said right side flange extends into the right gap defined between the right upwardly extending rear gate door stop and the forward surface of the rear gate door, and said left side flange extends into the left gap defined between the left upwardly extending rear gate door stop and the forward surface of the rear gate door when said trunk is installed in the rear bed of the truck and the rear gate door is in the closed position; and a bottom flange extending rearward from said rear perimeter surface and outward from said bottom wall of said container section, wherein said bottom flange extends into the bottom gap defined between the rearward end surface of the floor of the truck and the forward surface the rear gate door and includes a rearward surface so shaped that said bottom flange latchingly engages the recess in the rear gate door of the truck preventing upward removal of said trunk from the truck when said trunk is installed in the rear bed of the truck and the rear gate door is in the closed position.

3. The removable storage trunk of claim 2, wherein the right and left rear gate door stops each include a rearward side surface, wherein the forward surface of the rear gate door is substantially normal to the floor and opposite the rearward surfaces of the right and left rear gate door stops and the rearward end surface of the floor when in the closed position, wherein the forward surface of the rear gate door and the rearward side surface of the right rear gate door stop define a right gap therebetween and the forward surface of the rear gate door and the rearward side surface of the left rear gate door stop define a left gap therebetween when the rear gate door is in the closed position.

* * * * *